Jan. 1, 1957 R. TOWNSEND 2,776,418

DATA COMPARING DEVICES

Filed Aug. 19, 1953 2 Sheets-Sheet 1

INVENTOR
RALPH TOWNSEND

BY [signature]
ATTORNEY

INVENTOR
RALPH TOWNSEND
BY [signature]
ATTORNEY

United States Patent Office 2,776,418
Patented Jan. 1, 1957

2,776,418

DATA COMPARING DEVICES

Ralph Townsend, Letchworth, England, assignor to The British Tabulating Machine Company Limited, Letchworth, England Application August 19, 1953, Serial No. 375,226

Claims priority, application Great Britain October 20, 1952

11 Claims. (Cl. 340—149)

This invention relates to electronic apparatus for data-comparison.

The object of the invention is to provide an improved electronic device for the comparison of data represented by two serial pulse trains.

According to the invention apparatus for comparing first and second serial binary pulse trains to determine whether the second pulse train is not less than the first pulse train, has an electronic storage device settable to represent one or zero, means for setting said device to a starting condition, electronic means for comparing the setting of said device sequentially with the pulse positions of the second pulse train, commencing with the least significant position, and means for setting said device in accordance with a pulse position of the first pulse train, whenever the setting of said device and a corresponding pulse position of the second pulse train are alike, whereby the final setting of said device represents the required comparison result. Alternatively, the setting of the storage device may be compared with the pulse positions of the first pulse train and the storage device set to the opposite position of the second pulse train, whenever the setting of said device and the corresponding pulse position of the first pulse train are unlike.

Further according to the invention apparatus for comparing first and second serial binary pulse trains, to determine whether the second pulse train is greater or smaller than, or equal to, the first pulse train has two electronic storage devices, each settable to represent zero or one, means for initially setting one of said devices to zero and the other of said devices to one, electronic means for comparing the second pulse train, commencing with the least significant position, means for setting each of said devices in accordance with a pulse position of the first pulse train whenever the setting of that device and a corresponding pulse position of the second pulse train are alike and means controlled jointly by said two storage devices for providing an indication of the required comparison result. Alternatively, the setting of the two storage devices may be compared with the pulse positions of the first pulse train and each storage device set to the opposite of a pulse position of the second pulse train whenever the setting of that device and the corresponding pulse position of the first pulse train are unlike.

The invention will now be described, by way of example, with reference to the accompanying drawings, in which.

The expression "serial binary" pulse train is used throughout the specification to describe any train of pulses in which each pulse position is used to represent zero or one and the actual value assigned to a pulse position depends upon the time of occurrence in relation to the start of the pulse train. The simplest example is that in which each digit of a binary number is represented by one pulse position, the first position representing $2^0$, the next representing $2^1$, and so on, and a binary one being indicated by the presence of a pulse and a binary zero by the absence of a pulse. Alternatively, the one and zero representations can be pulses of opposite polarity. The data represented by such a pulse train need not be a value expressed in binary. For example, by coding the pulses in groups of four, a number may be represented in binary coded decimal form, as described in British patent specification No. 678,427.

It will be assumed as an example that the data to be compared consists of two binary numbers which are represented by two pulse trains each having thirty-two possible pulse positions. The least significant digit is represented by the pulse position occurring first in time, and a binary one is represented by a pulse and a binary zero by a blank position.

Figure 1:
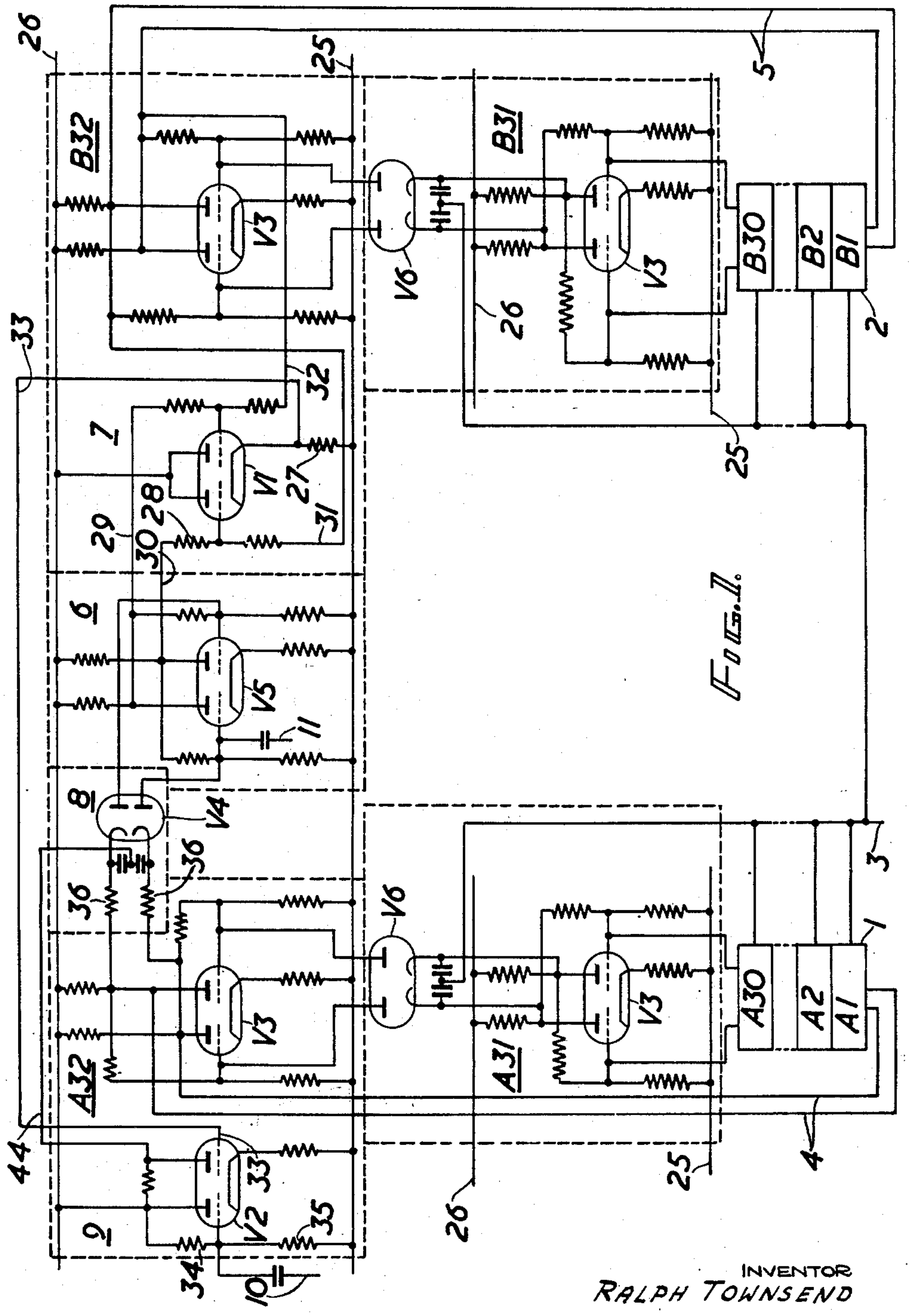
Figure 1 is a diagram of one form of comparison circuit.

The two pulse trains are temporarily stored on two shifting registers 1 and 2 (Figure 1). These registers are of known form and each consists of thirty-two similar trigger stages A1 to A32 and B1 to B32. Each trigger stage comprises a doubletriode V3 connected as a conventional cross-coupled trigger as shown for example at A31. Each trigger stage is coupled to the next higher stage through a known shift circuit formed by a double-diode V6. By applying suitable shift pulses to a line 3 connected to the shift circuits the stored data is shifted synchronously in the two registers so that it appears at the anode lines of the last stage A32, B32 of each of the registers 1, 2 as a serial pulse train.

The output of the register 1 is connected to the input by lines 4 through a further shift circuit, so that the pulse train is kept circulating in the register. Stages B32 and B1 of the register 2 are similarly connected by lines 5. The data is entered in the registers initially by direct setting of each trigger to one state to represent a binary one and to the other state to represent a binary zero.

The comparison of the two pulse trains is carried out serially starting with the least significant digit. The result of the comparison of the first position is stored on a trigger stage 6 comprising a double triode V5 connected as a cross-coupled trigger similar to the trigger stages of registers 1, 2. The result of the comparison of succeeding positions changes, or leaves unchanged, the setting of the trigger stage 6, according to the result. Thus the trigger stage 6 registers the overall comparison result when all the positions have been compared.

The two states of the trigger stage 6 are arbitrarily assigned to represent a "pulse" and a "no pulse" condition, corresponding to a binary one and a binary zero respectively. Furthermore, a binary one setting is used to indicate that, at the particular stage of comparison, the value readout from the register 2 is less than, or equal to, the value readout from the register 1. Conversely, a binary zero setting indicates that the value from register 2 is greater than the value from register 1. The trigger is set initially to one by a pulse on a line 11. This pulse is derived from the computer or other equipment with which the comparison apparatus as used and which supplies the data to be compared and the various control pulses.

Table 1 indicates the various conditions that may occur when comparing a pair of digits other than the first, which are registered on the stages A32 and B32.

TABLE 1

| Trigger 6 Setting | 0 | | | | 1 | | | |
|---|---|---|---|---|---|---|---|---|
| Register 1 digit | 0 | 1 | 0 | 1 | 0 | 1 | 0 | 1 |
| Register 2 digit | 1 | 1 | 0 | 0 | 1 | 1 | 0 | 0 |
| Trigger 6. To be set to | 0 | 0 | 0 | 1 | 0 | 1 | 1 | 1 |

From this table, two rules may be derived which determine the final setting of the trigger stage 6.

(1) If the setting of the trigger 6 is unlike the digit of register 2 being compared, the final setting of the trigger 6 remains the same;

(2) If the setting of the trigger 6 is the same as the digit of register 2 being compared, the setting of the trigger 6 is to be the same as the corresponding digit of register 1.

For example, if the trigger 6 is registering one at a particular stage of the comparison, then the partial value from the register 2 is less than or equal to that from the register 1. If the next digits are zero from the register 1 and one from the register 2, then the setting of the trigger stage 6 is the same as the digit from the register 2, and the trigger stage is set to zero to correspond to the digit from the register 1.

A coincidence circuit indicated generally at 7 is connected between trigger stage 6 and the last stage B32 of register 2. This circuit consists of a double triode V1 having a common cathode resistor 27. Each grid is connected to the junction of a pair of equal resistors 28. The other ends of these resistors are connected to the anodes of the two triggers 6, A32 as shown through lines 29 and 30 connected to trigger 6 and lines 31 and 32 connected to trigger B32.

The cathode of tube V1 is connected through line 33 to the right hand grid of a double triode V2 of a gate indicated generally at 9. The left hand grid is held at 110 volts positive by a potentional divider consisting of resistances 34 and 35 which are connected between positive supply line 26 and the ground line 25. This holds the common cathode a little more positive than 110 volts, so that the right hand half of V2 is normally non-conducting. Clock pulses are applied to the left hand grid by line 10, the clock pulses being interspersed in time with the shift pulses on line 3.

The last stage A32 of the register 1 is connected to the trigger stage 6 through a shift circuit indicated generally at 8. This shift circuit 8 is formed by a double diode V4. The cathodes are connected through resistors 36 to the anodes of a double triode V3 of the trigger stage A32. The anodes of V4 are connected to the two grids of double triode V5 of the trigger stage 6.

The operation of the circuit is as follows:—

The potential of an anode of the triggers 6, B32 is either 50 volts or 100 volts according to which state the trigger is in. If the two triggers 6, B32 are both representing zero, then the lines 29 and 32 will both be at 100 volts and the lines 30 and 31 will both be at 50 volts, for example. The cathode assumes a potential slightly greater than that of the most positive grid, so that line 33 will be a little more than 100 volts positive to ground line 25. If both triggers are one, the line 33 will still be maintained at approximately 100 volts.

When the two triggers are unlike, lines 29 and 32 will be at 50 volts and 100 volts respectively, or vice versa. Consequently, the related grid drops to 75 volts. The grid controlled by the lines 30 and 31 will similarly fall to 75 volts, so that the line 33 is held at approximately 75 volts positive. The voltage on line 33 will thus be 100 volts or 75 volts according to whether there is coincidence or anti-coincidence.

Turning now to gate 9, when a negative pulse of 30 volts amplitude is applied to the left hand grid of V2 via the line 10, this grid drops to 80 volts and the cathode potential follows it. If the cathode of V1 is at 75 volts corresponding to anti-coincidence, then the right hand half of V2 remains non-conducting despite the fall in the cathode potential. However if V1 is indicating coincidence, the voltage on the right hand grid of V2 is 100 volts and the fall of the cathode potential of V2 will be halted at 100 volts by conduction occurring in the right hand half. This conduction causes a fall in the anode potential of the right hand half of V2 which is fed as a negative pulse through line 44 to the cathodes of the shift circuit double diode V4.

The negative output pulses fed to the cathode of V4 from gate 9 is approximately 60 volts amplitude. The anodes and cathodes of V4 are so connected to triggers A32, 6 that when these triggers have the same setting, the cathode which is at 100 volts will have the corresponding anode at 33 volts, which is the potential of the more positive grid of V5. The cathode and anode of the other half of V4 are then at 50 volts and 22 volts positive respectively. When, therefore, a negative pulse is transmitted from gate 9 on coincidence between triggers 6, B32, it will be transmitted by one half of the diode but not the other, since the anode/cathode potentials are 50—22=28 volts and 100—33=67 volts, respectively. Thus the lower potential grid will be driven more negative and the trigger V5 will remain in the same state. If, however, the triggers A32, 6 are unlike, the anode/cathode potentials of V4 will be 50—33=17 volts and 100—22=78 volts, so that the negative pulse will be fed to the higher potential grid and the trigger 6 will be switched over. This form of shifting circuit is also used between the triggers of the registers 1 and 2.

The trigger V5 is set initially to one by applying a negative pulse on the line 11 to cut off the left hand half of the valve.

Thus if trigger 6 is unlike the final trigger stage B32 of register 2, the shift circuit 8 receives no pulse from gate 9 and trigger 6 is left unaffected. If, on the other hand, triggers 6, B32 are alike, shift circuit 8 receives a pulse which changes over trigger 6 only if that trigger is registering differently from trigger A32, to bring the settings of triggers A32 and 6 into agreement.

After the comparison of each pair of digits, the trigger stage 6 will register the result of the comparison up to this point. When thirty-two pulses have been applied on the line 3, all the digits of both numbers will have been shifted through the last stages of the register and the overall comparison result will be registered on the trigger stage.

The shifting registers 1 and 2 may readily be replaced by other forms of storage. For example, the trigger stages A32 and B32 may be set in accordance with digits read out serially from a magnetic drum storage. The pulses on the line 10 are preferably timed by a clock track on the drum in this case, so that synchronism is maintained.

By modifying the coincidence circuit 7 and the shift circuit 8, so that they are operative on pulses rather than the setting of trigger stages, the use of stages A32 and B32 may be avoided.

Alternatively, a one setting may be taken as indicating that the value in the register 1 is less than that in the register 2, a zero setting may be taken as indicating that the value in the register 2 is greater than, or equal to, the value in the register 1 and the trigger stage 6 is then initially set to zero. From Table 1 it will be seen that the rules for setting the trigger 6 are the same as those already given. In each case, the trigger stage 6 is set to indicate equal, according to the convention adopted, before the comparison begins.

If the rules determining the setting of the trigger 6 are modified, the coincidence circuit 7 may be replaced by an anti-coincidence circuit. The rules then become:

(1) If the setting of the trigger 6 and the register 2 are unlike, the trigger 6 is set to the opposite of the setting of register 1 stage B32.

(2) If the setting of the trigger 6 and the register 2 are the same, the trigger 6 setting remains the same.

In order that the circuit of Figure 1 should operate according to these rules, it is only necessary to connect lines 29, 30 of circuit 7 to the right hand and left hand anodes respectively of trigger 6 instead of the manner shown in the figure.

Following these rules it will be seen that if the trigger 6 is initially set to zero, then a zero setting of the trigger indicates that the value in the register 2 is less than or equal to the value in the register 1. Correspondingly, a one setting indicates that the value in the register 2 is greater than that in the register 1. If the trigger 6 is initially set to one, then a zero setting indicates that register 2 is less than register 1 and a one setting indicates that register 2 is greater than or equal to register 1.

By using two circuits of the type described, it is possible to obtain a unique indication of the three possible comparison conditions, that is, register 2 greater than, equal to, or less than register 1. In an arrangement using coincidence circuits, a pulse on a line 18 (Figure 2) initially sets a first comparison indicator trigger 16 to zero and a second trigger 17 to one. The indications provided by the two triggers are then:

Trigger 16 set to zero—Register 2≥Register 1.
Trigger 16 set to one—Register 2<Register 1.
Trigger 17 set to zero—Register 2>Register 1.
Trigger 17 set to one—Register 2≤Register 1.

From this, the indications for the three comparison conditions are:

Register 2>Register 1—Trigger 17 set to zero.
Register 2=Register 1—Trigger 17 to one and Trigger 16 set to zero.
Register 2<Register 1—Trigger 16 set to one.

The setting of the stage B32 is compared with that of the trigger 16 by a coincidence circuit 12 and with that of the trigger 17 by a coincidence circuit 13. Each of the coincidence circuits controls a gate 14, which in turn controls a shift circuit 15 for shifting the setting of A32 into each of the triggers whenever the related coincidence circuit is operated.

The anode potentials of the trigger 16 determine the control grid potentials of a triode 19 and a pentode 20. With the trigger 16 set at one, the grid potential of the triode 19 allows it to conduct and the control grid of the pentode is held below cut-off. Similarly, with the trigger 17 set to zero, a triode 21 is allowed to conduct and the suppressor grid potential of the pentode 20 is held below cut-off. When either trigger is set to the other state, the potentials of the two grids which it controls are interchanged.

The lines 22, 23 and 24 are connected to the anodes of the valves 19, 20 and 21 and consequently drop in potential when the related valve is conducting. The triodes 21 and 19 are controlled directly by the triggers, corresponding to the first and third comparison conditions. For the pentode 20 to conduct, both control and suppressor grids must be above cut-off, which occurs only on the second condition when the trigger 17 is set at one and the trigger 16 is set at zero. Hence the comparison indication may now be written as:

Register 2>Register 1—Line 24 low potential.
Register 2=Register 1—Line 23 low potential.
Register 2<Register 1—Line 22 low potential.

Figure 2:
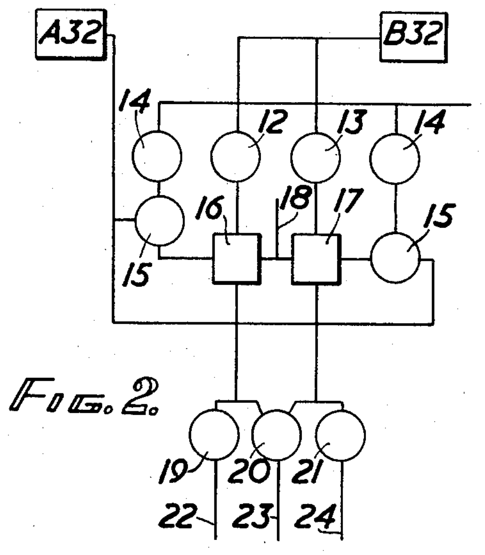
Figure 2 is a block diagram of a modified form of comparison device.
Figure 3:
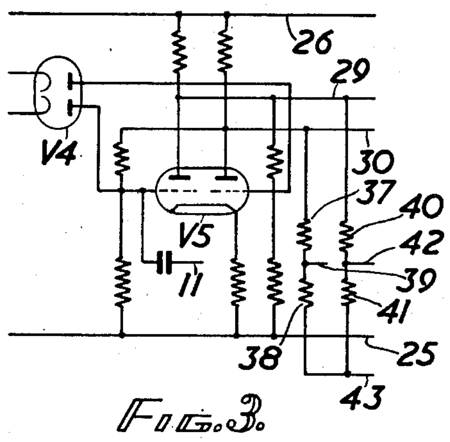
Figure 3 is a circuit diagram of a comparison indicator trigger used in the circuit of Figure 2.

In Figure 2, each of the triggers 16, 17 has to control two output stages. A modified form of the trigger 6 of Figure 1 is used for this purpose, the modifications being shown in Figure 3 in which potential dividers are included in the circuit. Resistors 38 and 37 are connected between the anode of V5, which is at the lowest potential when the trigger is set to one, and a negative supply line 43. A line 39 from the junction of the two resistors is connected to the control grid of the triode 21. Resistors 40 and 41 are connected between the other anode of V5 and the line 43. A line 42 from the junction of the two resistors is connected to the suppressor grid of pentode 20.

The trigger 16 is similar to V5 except that the line 11 supplies pulses to the right hand grid so that the trigger is initially set to zero. Two potential dividers, similar to those described, control the potentials of the suppressor grid of the pentode 20 and the control grid of the triode 21.

What we claim is:

1. Apparatus for comparing first and second serial binary pulse trains having an electronic storage device settable to represent one or zero, means for setting said device to be starting condition, electronic means for comparing the setting of said device sequentially with the pulse positions of the second pulse train commencing with the least significant position and means for setting said device in accordance with the pulse position of the first pulse train whenever the setting of the said device and a corresponding pulse position of the second pulse train are alike, whereby the final setting of said device indicates whether the second pulse train is or is not less than the first pulse train.

2. Apparatus for comparing first and second serial binary pulse trains having an electronic storage device settable to represent one or zero, means for setting said device to a starting condition, electronic means for comparing the setting of said device sequentially with the pulse positions of the second pulse train commencing with the least significant position and means for setting said device to the opposite of a pulse position of the first pulse train whenever the setting of said device and a corresponding pulse position of the second pulse train are unlike whereby the final setting of said device indicates whether the second pulse train is or is not less than the first pulse train.

3. Apparatus for comparing first and second serial binary pulse trains having two electronic storage devices each settable to represent zero or one, means for initially setting one of said devices to zero and the other of said devices to one, electronic means for comparing the setting of each of said devices sequentially with the pulse positions of the second pulse train commencing with the least significant position and means for setting each of said devices in accordance with a pulse position of the first pulse train whenever the setting of that device and a corresponding pulse position of the second pulse train are alike and means controlled jointly by said two storage devices for providing an indication of the required comparison result.

4. Apparatus for comparing first and second serial binary pulse trains having two electronic storage devices each settable to represent zero or one, means for initially setting one of said devices to zero and the other of said devices to one, electronic means for comparing the settings of said devices sequentially with the pulse positions of the second pulse train commencing with the least significant position and means for setting each of said storage devices to the opposite of a pulse position of the first pulse train whenever the setting of that device and a corresponding pulse position of the second pulse train are unlike, and means controlled jointly by the two storage devices for providing an indication of whether the second pulse train is greater than, equal to, or smaller than the first pulse train.

5. Apparatus for comparing two serial binary pulse trains having first, second and third bi-stable electronic devices, means for setting the first and second bi-stable devices to represent corresponding pulse positions of the two pulse trains in succession, means for initially setting the third bi-stable device to a pre-determined state, means for comparing the settings of the first and third bi-stable devices and means controlled by the comparing means and by the second bi-stable device for finally setting the third bi-stable device.

6. Apparatus for comparing two serial binary pulse trains having three electronic trigger circuits, means for setting a pair of said trigger circuits in accordance with the two pulse trains, means for initially setting the third trigger circuit to a predetermined state, a conicidence circuit for comparing the setting of one of said pair of trigger circuits and of the third trigger circuit and a shift circuit for transferring the setting of the other of said trigger circuits to the third trigger circuit under control of the coincidence circuit.

7. Apparatus for comparing two serial binary pulse trains comprising a first pair of electronic trigger circuits, a second pair of electronic trigger circuits, means for setting sequentially a first trigger circuit of said first pair in accordance with the pulse positions of a first pulse train starting with the least significant position, means for setting sequentially the second trigger circuit of said first pair in accordance with the pulse positions of a second pulse train starting with the least significant position, means for initially setting a first trigger circuit of said second pair to one and the second trigger circuit of said second pair to zero, a first coincidence circuit for comparing the setting of said second trigger circuit of said first pair with the setting of said first trigger circuit of said second pair, a second coincidence circuit for comparing the setting of said second trigger circuit of said first pair with the setting of said second trigger circuit of said second pair, means controlled by said first coincidence circuit for transferring the setting of said first trigger circuit of said first pair to the first trigger circuit of said second pair when the settings of said second trigger circuit of said first pair and said first trigger circuit of said second pair are alike, and means controlled by said second coincidence circuit for transferring the setting of said first trigger circuit of said first pair to said second trigger circuit of said second pair when the settings of said second trigger circuit of said first pair and said second trigger circuit of said second pair are alike.

8. Apparatus as claimed in claim 7 having three output devices controlled by said second pair of trigger circuits.

9. Apparatus as claimed in claim 8 in which each trigger circuit of said second pair controls two of the three output devices.

10. Apparatus for comparing two serial pulse trains having an electronic storage device, a coincidence senser for comparing the pulse positions of one pulse train sequentially with the setting of the storage device, first means under control of the coincidence senser and of the other pulse train for setting said storage device and second means for setting said storage device to an initial condition.

11. Apparatus for comparing two serial pulse trains having a bi-stable electronic device, an anti-coincidence circuit for comparing the pulse positions of one pulse train with the setting of said bi-stable device, means for initially setting said bi-stable device and means controlled by the anti-coincidence circuit and by the other pulse train for setting said bi-stable device.

References Cited in the file of this patent

UNITED STATES PATENTS

| | | |
|---|---|---|
| 2,318,591 | Couffignal | May 11, 1943 |
| 2,615,127 | Edwards | Oct. 21, 1952 |
| 2,623,171 | Hill, et al. | Dec. 23, 1952 |
| 2,634,052 | Bloch | Apr. 7, 1953 |
| 2,641,696 | Woolard | June 9, 1953 |
| 2,648,829 | Ayres, et al. | Aug. 11, 1953 |
| 2,679,034 | Albrighton | May 18, 1954 |